Mar. 27, 1923.

E. R. Mac TYRE 1,449,866

AUTOMOBILE APPLIANCE

Filed Feb. 28, 1922    2 sheets-sheet 1

E. R. MacTyre
INVENTOR.

BY *[signature]*
ATTORNEY.

Mar. 27, 1923.
E. R. Mac TYRE
AUTOMOBILE APPLIANCE
Filed Feb. 28, 1922
1,449,866
2 sheets-sheet 2
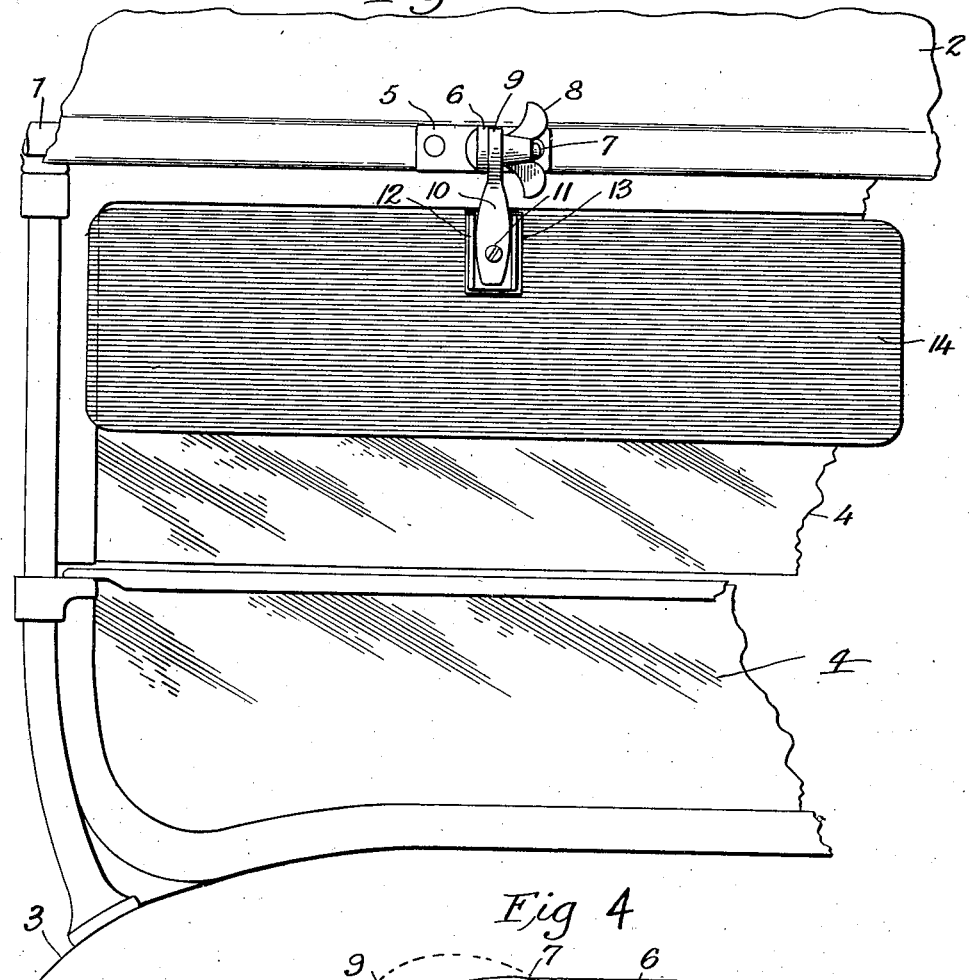
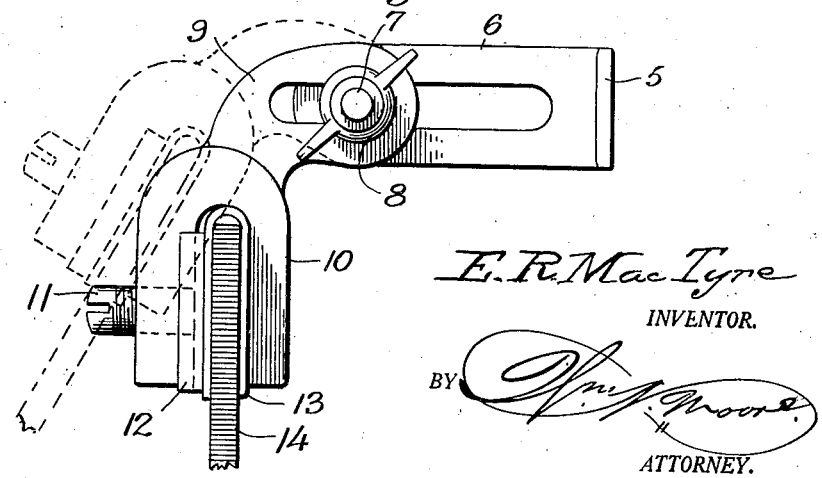
E. R. Mac Tyre
INVENTOR.
BY
ATTORNEY.

Patented Mar. 27, 1923.

1,449,866

UNITED STATES PATENT OFFICE.

EUGENE R. MacTYRE, OF TITUSVILLE, PENNSYLVANIA.

AUTOMOBILE APPLIANCE.

Application filed February 28, 1922. Serial No. 539,983.

*To all whom it may concern:*

Be it known that I, EUGENE R. MACTYRE, a resident of Titusville, in the county of Crawford and State of Pennsylvania, a citizen of the United States, have invented certain new and useful Improvements in Automobile Appliances, of which the following is a specification.

My invention relates to improvements in automobile appliances and refers particularly to an appliance for attachment to the forward portion of the top frame of the machine which will serve to remove the glare from the rays of light produced by the sun or by strong lights of approaching machines, to thus provide a device which will prove a great comfort and convenience to the driver and eliminate entirely the possibility of accidents from the blinding glare from the sun or light rays.

The main object of my invention is the provision of a device which can be easily applied without interfering with the operation or function of the windshield and which will not in the least obstruct the proper vision of the driver but which will destroy the blinding glare from the sun or the light upon the lamps of approaching cars.

Another object of my invention is the provision of a device of the character and for the purpose stated which can be easily applied or removed with facility; which will not mar or detract from the general appearance of the automobile; which can be adjusted to any desired or required position and which in every particular will prove desirable, practical and efficient.

To attain the desired objects the invention consists of an appliance of the character and for the purpose stated embodying novel features of construction and combination of parts for service, substantially as shown, described and particularly defined and distinguished by the claims.

In order that the construction in detail and the operation of my appliance may be fully understood and its many advantages be entirely appreciated, I have shown in the accompanying drawings a structure embodying my invention, and to which for a complete understanding I invite attention.

Fig. 3 represents a view of a portion of the top, wind-shield and machine showing my appliance in position thereon, and Fig. 4 represents a side elevation of the bracket shown on enlarged scale, and in dotted lines showing an adjusted position.

Figure 1:
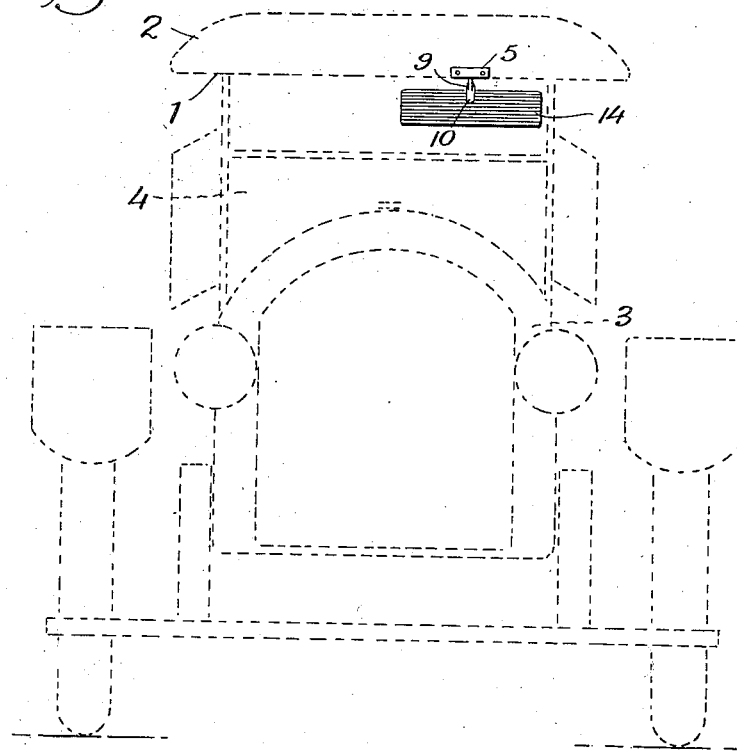
Figure 1 represents a front view of an automobile shown in dotted lines, with my appliance in the proper position thereon and shown in full lines, said figure illustrating the general appearance and application of my device.
Figure 2:
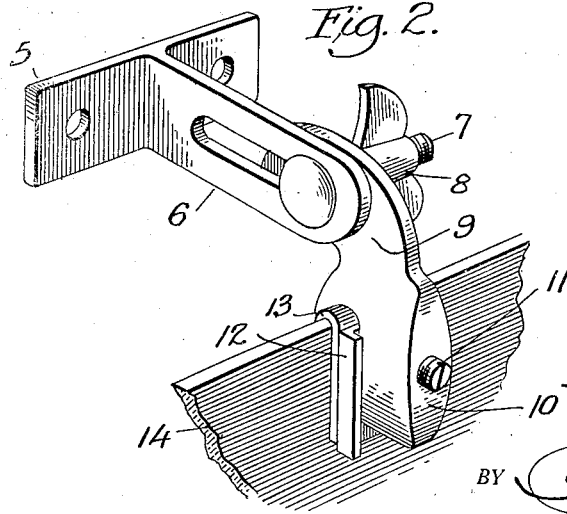
Fig. 2 represents a perspective view on an enlarged scale of the bracket and a portion of the glass light dimming panel, the bracket being of novel construction and forming the important part of my invention.

I have shown my appliance as applied or attached to the frame 1, which supports the top 2, of the automobile 3, and in proper position with reference to the windshield 4, all of which parts are the usual and common construction.

The main essential feature of my invention resides in the supporting means or bracket, which consists of the attaching member 5, which is bolted or fastened to the top and which is formed with the slotted arm 6, such slotted member receiving the clamping screw 7, engaged by the winged nut 8, which thus serves to bind the curved bracket arm 9, which is formed with the slotted or bifurcated lower end or head 10, which head carries the screw 11, which engages the channeled pressing plate 12, to secure the gasket member 13, which is seated in the bifurcated head and is thus caused to bear upon the edge of the glass panel 14.

From this construction it will be observed that the glass panel which is made of a colored glass, and preferably blue or purple, and acts to dim or soften the rays of light, is clamped in the bifurcated member of the bracket and is thus disposed in the proper position with reference to the machine and driver and while not in the least interfering with the operation or function of the windshield, absolutely prevents the glare of the sun or penetrating light from blinding the eyes of the driver, thus insuring comfort and satisfaction to the driver and preventing the horrible accidents which are constantly occurring by reason of the operator becoming confused by the glare.

It will be instantly apparent that the peculiar and novel construction of the bracket permits the device to be attached rigidly to the machine and also allows of any adjustment to place the glass panel in the most advantageous position and that the panel cannot possibly be injured as no fastening means pass through the panel, but merely a clamp action is provided between the bracket and panel.

It will also be apparent that the device will not detract from the appearance of the machine and can be produced at a very small price and thus make its use practically necessary.

I claim:

1. An appliance of the character and for the purpose stated, consisting of an attaching member provided with a slotted arm, an attaching plate arranged at a right-angle to said slotted arm, an adjustable slotted member clamped on said slotted arm, a bifurcated head formed on said slotted member, a clamping plate adjustably mounted in the bifurcation of said head, a gasket fitted in said bifurcated head, a screw fitting in the head and plate and forcing said plate against said gasket, and a glass panel clamped in said gasket by the action of said clamping plate.

2. An automobile appliance consisting of a vertically disposed member adapted to be rigidly secured to the frame of the automobile top, an arm extending horizontally from said member and formed with a slot, a curved member formed with a slot in its upper end to cooperate with the slot in said arm, an adjusting clamp engaging said slots to secure said curved arm in proper adjustment, a bifurcated head formed on the lower end of said curved member, a dimming panel fitting in said bifurcated head and adjustable therein, a clamping plate for securing said panel, and a screw connected to said clamping plate and mounted in the outer part of said bifurcated head for manually adjusting and clamping the panel horizontally to place said panel in proper position to suit the driver.

In testimony whereof I hereunto affix my signature.

EUGENE R. MacTYRE.